United States Patent
Wu et al.

(10) Patent No.: US 7,881,459 B2
(45) Date of Patent: Feb. 1, 2011

(54) ACOUSTIC ECHO CANCELLER USING MULTI-BAND NONLINEAR PROCESSING

(75) Inventors: Jincheng Wu, Naperville, IL (US); Joel A. Clark, Woodbridge, IL (US)

(73) Assignee: Motorola, Inc., Schaumburg, IL (US)

( * ) Notice: Subject to any disclaimer, the term of this patent is extended or adjusted under 35 U.S.C. 154(b) by 577 days.

(21) Appl. No.: 11/839,518

(22) Filed: Aug. 15, 2007

(65) Prior Publication Data
US 2009/0046847 A1    Feb. 19, 2009

(51) Int. Cl.
    *H04M 9/08* (2006.01)
(52) U.S. Cl. .................. 379/406.01; 370/290; 379/3; 379/406.02; 379/406.05; 379/406.08; 455/570
(58) Field of Classification Search ........... 370/286, 370/289, 290; 379/406.01, 406.08, 3, 406.02, 379/406.05; 381/66; 704/248; 455/570
See application file for complete search history.

(56) References Cited

U.S. PATENT DOCUMENTS

| | | | |
|---|---|---|---|
| 5,001,701 A | | 3/1991 | Gay |
| 5,315,585 A | * | 5/1994 | Iizuka et al. ............... 370/289 |
| 5,463,618 A | * | 10/1995 | Furukawa et al. ........... 370/290 |
| 5,598,468 A | | 1/1997 | Ammicht et al. |
| 5,796,820 A | * | 8/1998 | Sasada .................. 379/406.08 |
| 5,825,754 A | * | 10/1998 | Williams .................. 370/290 |
| 5,960,077 A | * | 9/1999 | Ishii et al. ............. 379/406.08 |
| 6,442,275 B1 | | 8/2002 | Diethorn |
| 6,480,610 B1 | | 11/2002 | Fang et al. |
| 6,522,746 B1 | | 2/2003 | Marchok et al. |
| 6,580,795 B1 | | 6/2003 | Li et al. |
| 6,678,376 B1 | * | 1/2004 | Takahashi et al. ....... 379/406.01 |
| 6,718,035 B2 | * | 4/2004 | Younce et al. .......... 379/406.01 |
| 6,760,436 B1 | * | 7/2004 | Takada .................. 379/406.01 |
| 6,775,653 B1 | * | 8/2004 | Wei ........................... 704/248 |
| 6,792,107 B2 | * | 9/2004 | Tucker et al. .......... 379/406.08 |
| 6,795,550 B1 | * | 9/2004 | Chen ..................... 379/406.01 |
| 6,804,203 B1 | * | 10/2004 | Benyassine et al. ......... 370/286 |
| 6,947,552 B2 | * | 9/2005 | Takada .................. 379/406.08 |
| 6,968,064 B1 | | 11/2005 | Ning |
| 6,975,722 B2 | * | 12/2005 | Davis et al. ............ 379/406.08 |
| 6,999,560 B1 | * | 2/2006 | Connor et al. ................. 379/3 |
| 7,020,278 B2 | * | 3/2006 | Farrell et al. ........... 379/406.05 |

(Continued)

OTHER PUBLICATIONS

International Search Report and Written Opinion, PCT (Patent Cooperation Treaty), International Application No. PCT/US2008/072743, International Filing Date: Nov. 8, 2008, Priority Date: Aug. 15, 2007, 15 pages.

(Continued)

*Primary Examiner*—Gerald Gauthier
(74) *Attorney, Agent, or Firm*—Cuenot, Forsythe & Kim, LLC

(57) ABSTRACT

An echo canceller (106) can include a first multi-band filter (152) which receives a first input signal (108) and generates a first plurality of sub-band signals (110, 111, 112), and a second multi-band filter (154) which receives a second input signal (122) and generates a second plurality of sub-band signals (156, 157, 158). The echo canceller also can include a plurality of double talk detectors (168, 169, 170) that each generate a double talk flag (182, 183, 184) based on at least a respective one of the first sub-band signals and a respective one of the second sub-band signals.

20 Claims, 4 Drawing Sheets

U.S. PATENT DOCUMENTS

| | | |
|---|---|---|
| 7,039,181 B2 | 5/2006 | Marchok et al. |
| 7,050,545 B2 * | 5/2006 | Tanrikulu et al. ...... 379/406.08 |
| 7,231,234 B2 * | 6/2007 | Awad et al. ................. 455/570 |
| 7,330,738 B2 * | 2/2008 | Kang et al. ................. 455/570 |
| 7,359,504 B1 * | 4/2008 | Reuss et al. ............ 379/406.02 |
| 7,564,964 B2 * | 7/2009 | Takada .................. 379/406.08 |
| 2003/0133565 A1 * | 7/2003 | Chang et al. ........... 379/406.01 |
| 2004/0125943 A1 * | 7/2004 | Davis .................... 379/406.01 |
| 2004/0151303 A1 * | 8/2004 | Park et al. .............. 379/406.01 |
| 2005/0129225 A1 | 6/2005 | Piket et al. |
| 2008/0075270 A1 * | 3/2008 | Kamiya ................. 379/406.08 |
| 2008/0298601 A1 * | 12/2008 | Rahbar ......................... 381/66 |

OTHER PUBLICATIONS

Jia, et al., Subband Doubletalk Detector for Acoustic Echo Cancellation Systems, Apr. 2003, pp. 604-607, 0-7803-7663-3/03, IEEE.

Weiss, et al., Steady-State Performance Limitations of Subband Adaptive Filters, IEEE, IEEE Transactions on Signal Processing, Sep. 2001, pp. 1982-1991, vol. 49, No. 9, IEEE.

Harteneck, et al., Design of Near Perfect Reconstruction Oversampled Filter Banks for Subband Adaptive Filters, IEEE Transactions on Circuits and Systems—II: Analog and Digital Signal Processing, Aug. 1999, pp. 1081-1085, vol. 46, No. 8, IEEE.

Le Bouquin Jeannes, et al., Combined Noise and Echo Reduction in Hands-Free Systems: A Survey, IEEE Transactions on Speech and Audio Processing, Nov. 2001, pp. 808-820, vol. 9, No. 8, IEEE.

Dyba, et al., Motorola Packet Telelphony Echo Cancellation Solutions, Jul. 2003, White Paper Series, http://www.freescale.com/files/dsp/doc/white_paper/PTECANWP.pdf, 55 pgs.

Ting, et al., Adaptive Signal Processing for ESM, Communications Signal Processing website: http://www.ee.qub.ac.uk/dsp/csp/projects.html, Accessed Aug. 30, 2007, 5 pgs.

* cited by examiner

ACOUSTIC ECHO CANCELLER USING MULTI-BAND NONLINEAR PROCESSING

BACKGROUND OF THE INVENTION

1. Field of the Invention

The present invention generally relates to duplex communications and, more particularly, to echo cancellation.

2. Background of the Invention

During a duplex communication session, for instance between two telephones, acoustic echo arises when output audio signals generated by a first device's loudspeaker are detected by the device's microphone. If not addressed, the acoustic echo will be communicated back to a second device that was the original source of the audio signal, which is undesirable.

Echo cancellers using non-linear processing techniques oftentimes are used to reduce acoustic echo. Such echo cancellers typically include a double talk (DBTK) detector. The DBTK detector detects audio signals from both devices, and outputs a signal to indicate which of the devices are currently generating source audio. When the DBTK detector detects that a single device is generating source audio, the non-linear processing attenuates audio signals from the other device that is not the original audio source, thereby significantly reducing any acoustic echo that may be generated. If the DBTK detector detects that both devices are simultaneously generating source audio, the non-linear processing applies less attenuation to the audio signals so as to maintain full duplex communication, although more echo may be present in comparison to when a single device is generating source audio.

Unfortunately, DBTK detectors are not perfect at identifying which of the devices are generating source audio. Consequently, an improper level of attenuation is sometimes applied. For instance, if a single device is generating source audio, but the DBTK detector indicates that both devices are doing so, the device generating the source audio will receive more echo than it otherwise would if the DBTK detection were more accurate. Similarly, if both devices are generating source audio, but the DBTK detector indicates that only one of the devices is doing so, a high level of attenuation will be applied to the source audio from the other device, essentially muting the audio from that device.

SUMMARY OF THE INVENTION

The present invention relates to an echo canceller. The echo canceller can include a first multi-band filter which receives a first input signal and generates a first plurality of sub-band signals. Each of the first plurality sub-band signals can include a respective sub-band of the first input signal. The echo canceller also can include a second multi-band filter which receives a second input signal and generates a second plurality of sub-band signals. Each of the second plurality of sub-band signals can include a respective sub-band of the second input signal. Further, the echo canceller can include a plurality of double talk detectors. Each of the double talk detectors can generate a double talk flag based on at least a respective one of the first sub-band signals and a respective one of the second sub-band signals. A plurality of non-linear processors also can be provided. Each of the non-linear processors can receive at least a respective one of the double talk flags from at least one of the double talk detectors. Further, each of the non-linear processors can process the double talk flag to generate a sub-band output signal having reduced echo.

The echo canceller further can include a multi-band combiner. The multi-band combiner can receive each of the sub-band output signals and combine the respective sub-band output signals into a broadband output signal. The multi-band combiner can receive each of the sub-band output signals from the respective non-linear processors. A noise suppressor also can be provided. The noise suppressor can generate a noise status indicator and communicate the noise status indicator to each of the plurality of double talk detectors. In addition, the echo canceller can include a plurality of adaptive filters. Each of the adaptive filters can receive a respective one of the double talk flags and a respective one of the second sub-band signals. The adaptive filters also can filter the second sub-band signal in accordance with the received double talk flag.

The echo canceller also can include a plurality of adders. Each of the adders can receive a respective one of the first sub-band signals and a respective one of the second sub-band signals, and generate an error signal that is a difference of the first sub-band signal and the second sub-band signal. Each of the adders can communicate a respective error signal to a respective double talk detector. Each of the error signals also can be communicated to a respective one of the non-linear processors. Each of the non-linear processors can generate the respective sub-band output signal from the respective error signal.

A plurality of adaptive filters also can be provided. Each of the adaptive filters can receive a respective one of the double talk flags and a respective one of the second sub-band signals, and can filter the second sub-band signal in accordance with the received double talk flag to generate a filtered second sub-band signal. The second sub-band signals received by the adders can be filtered second sub-band signals.

The present invention also relates to an echo canceller that includes a first multi-band filter which receives a first input signal and generates a first plurality of sub-band signals. Each of the first plurality sub-band signals can include a respective sub-band of the first input signal. The echo canceller also can include a second multi-band filter which receives a second input signal and generates a second plurality of sub-band signals. Each of the second plurality of sub-band signals can include a respective sub-band of the second input signal. A noise suppressor that generates a noise status indicator also can be provided. The noise suppressor can communicate the noise status indicator to each of a plurality of double talk detectors. Each of the plurality of double talk detectors can generate a double talk flag based on at least a respective one of the first sub-band signals, a respective one of the second sub-band signals, and the noise status indicator.

The echo canceller further can include a plurality of non-linear processors. Each of the non-linear processors can receive at least a respective one of the double talk flags from at least one of the double talk detectors and process the double talk flag to generate a sub-band output signal having reduced echo. The echo canceller also can include a plurality of adaptive filters. Each of the adaptive filters can receive a respective one of the double talk flags and a respective one of the second sub-band signals, and filter the second sub-band signal in accordance with the received double talk flag.

The present invention also relates to a method of cancelling echo in a duplex communication device. The method can include receiving a first input signal and generating a plurality of sub-band signals. Each of the first plurality of sub-band signals can include a respective sub-band of the first input signal. A second input signal can be received and a second plurality of sub-band signals can be generated. Each of the second plurality of sub-band signals can include a respective sub-band of the second input signal. The method further can include generating a plurality of double talk flags. Each of the double talk flags can be based on at least a respective one of the first sub-band signals and a respective one of the second sub-band signals. Each of the double talk flags can be processed to generate a respective sub-band output signal having reduced echo.

In addition, the method can include receiving each of the sub-band output signals and combining the respective sub-band output signals into a broadband output signal. Further, a noise status indicator can be generated and communicated to each of a plurality of double talk detectors, each of which generates a respective one of the double talk flags. For each of the first sub-band signals, a respective one of the double talk flags and a respective one of the second sub-band signals can be received. The second sub-band signal can be filtered in accordance with the received double talk flag.

The method also can include, for each of the first sub-band signals and the respective second sub-band signals, generating an error signal that is a difference of the first sub-band signal and the second sub-band signal, and communicating the error signal to a respective double talk detector. Further, each of the error signals can be communicated to a respective one of the non-linear processors. In such an arrangement, processing each of the double talk flags to generate a respective sub-band output signal can include processing the error signal.

For each of the first sub-band signals, a respective one of the double talk flags and a respective one of the second sub-band signals can be received. The second sub-band signal can be filtered in accordance with the received double talk flag to generate a filtered second sub-band signal. In such an arrangement, generating the error signal can include generating an error signal that is a difference of the first sub-band signal and the filtered second sub-band signal.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
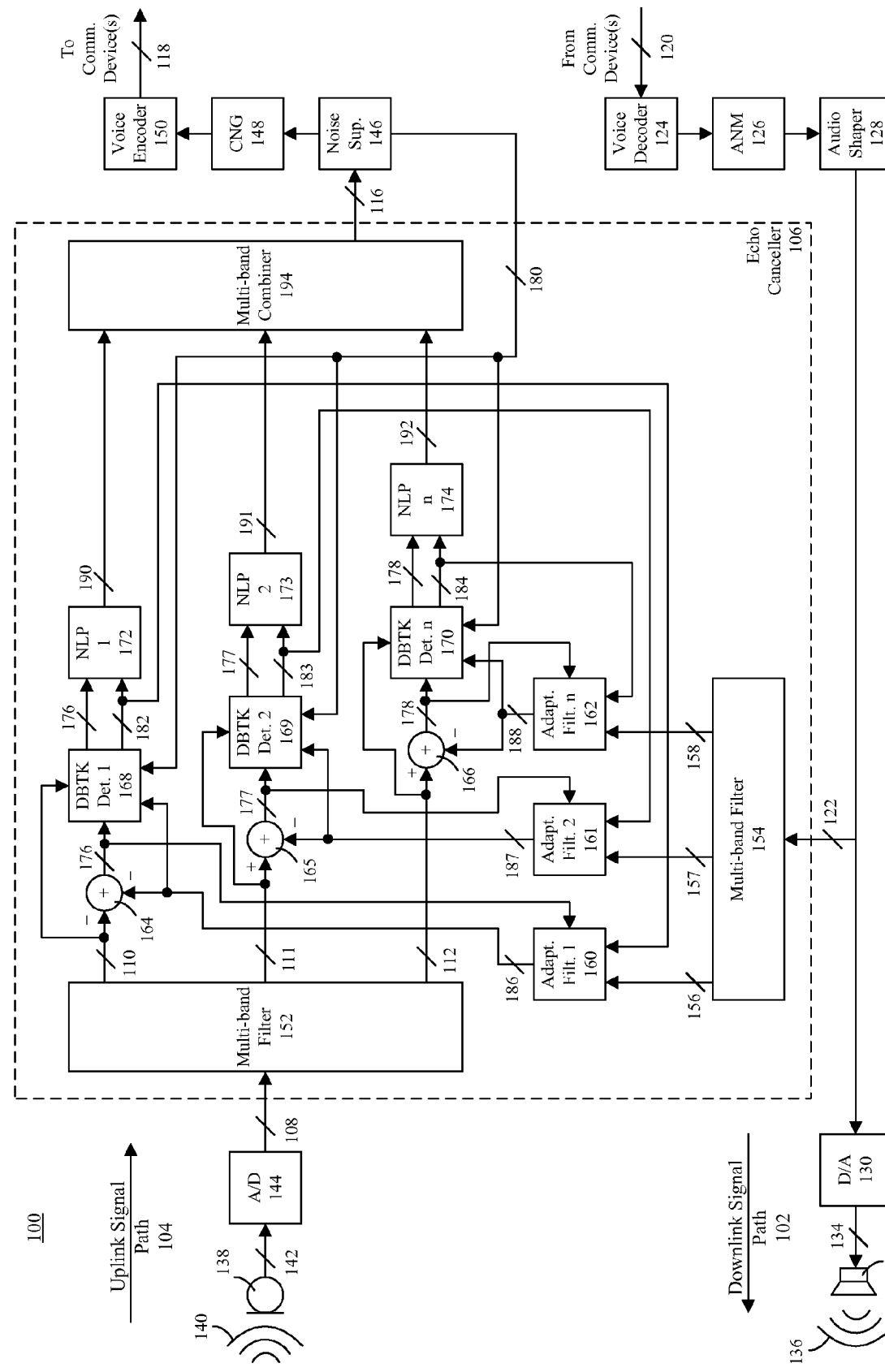
FIG. 1 depicts a block diagram of a communication device that is useful for understanding the present invention.

FIG. 1 depicts a block diagram of a communication device 100 that is useful for understanding the present invention. The communication device 100 can be a duplex communication device, which may include a downlink signal path 102 and an uplink signal path 104. On the uplink signal path 104, the communication device 100 can include an echo canceller 106 that receives a near end input audio signal 108 (hereinafter "first input signal"), divides the first input signal 108 into a plurality of sub-band signals 110, 111, 112 and implements echo cancellation on the individual sub-band signals 110-112. The echo canceller 106 then can process the sub-band signals 110-112 to generate an output signal 116, which may be further processed to generate an output signal 118 and communicated to one or more other communication devices. Advantageously, in comparison systems of the prior art, the echo canceller 106 can significantly reduce the amount of echo present in the output signal 118.

For the purposes of clarity, three sub-band signals 110-112 are depicted in the echo canceller 106, but the invention is not limited in this regard. Indeed, the echo canceller 106 can implement echo cancellation on any number of sub-band signals. For example, the echo canceller 106 can implement echo cancellation on fewer than three sub-band signals or on more than three sub-band signals.

Various arrangements of the communication device 100 now will be described with particularity. Referring to the downlink signal path 102, one or more signal processing components may be provided to process a downlink signal 120 to generate a second input signal 122. For example, the downlink signal path 102 can include a voice decoder 124, an adaptive noise mask 126 and an audio shaper 128. Such components and their operation are known to the skilled artisan. Additional components (not shown) also can be included on the downlink signal path 102 to process the downlink signal 120, for instance a transceiver, and the invention is not limited in this regard.

The downlink signal path 102 also may include a digital to analog (D/A) converter 130 and an output audio transducer 132 (e.g. loudspeaker). The D/A converter 130 can convert the second input audio signal 122 into an analog output audio signal 134, which may be communicated to the output audio transducer 132 to generate an output acoustic signal 136. The output acoustic signal 136 can be presented to a user of the communication device 100.

The uplink signal path 104 can include an input audio transducer 138 (e.g. microphone) that receives an input acoustic signal 140 from the user and generates a corresponding analog input audio signal 142, and an analog to digital (A/D) converter 144 that converts the analog input audio signal 142 into the first input signal 108. In addition, a noise suppressor 146, a comfort noise generator 148, and a voice encoder 150, each of which are known to the skilled artisan, can be provided to process the output signal 116 and generate the output signal 118. Additional components (not shown) also can be included on the uplink signal path 104, such as a transceiver and/or other suitable signal processing components.

The uplink signal path 104 also can include the echo canceller 106. The echo canceller 106 can include a first multi-band filter 152 that divides the first input signal 108 into the plurality of sub-band signals 110-112, and a second multi-band filter 154 that divides the second input signal 122 into a plurality of sub-band signals 156, 157, 158. The first and second multi-band filters 152, 154 can be, for example, Discrete Fourier Transform (DFT) Polyphase Analyzers.

The echo canceller 106 further can include a plurality of adaptive filters 160, 161, 162, a plurality of adders 164, 165, 166, a plurality of double talk (DBTK) detectors 168, 169, 170 and a plurality of non-linear processors 172, 173, 174. The number of the adaptive filters 160-162, adders 164-166, DBTK detectors 168-170 and non-linear processors 172-174 can correspond to the number of sub-band signals 110-112 processed by the echo canceller 106. In that regard, the adaptive filter 160, adder 164, DBTK detector 168 and non-linear processor 172 can process sub-band signals 110 and/or sub-band signals 156 on a first sub-band. Similarly, the adaptive filter 161, adder 165, DBTK detector 169 and non-linear processor 173 can process sub-band signals 111 and/or sub-band signals 157 on a second sub-band. Further, the adaptive filter 162, adder 166, DBTK detector 170, and non-linear processor 174 can process sub-band signals 112 and/or sub-band signals 158 on a third sub-band, and so on.

The adders 164-166 each can generate a respective error signal 176, 177, 178. The error signal 176 can be a difference of the sub-band signal 110 and the sub-band signal 156, the error signal 177 can be a difference of the sub-band signal 111 and the sub-band signal 157, and the error signal 178 can be a difference of the sub-band signal 112 and the sub-band signal 158. In one arrangement, the filtered versions 186, 187, 188 of the sub-band signals 156, 157, 158, respectively, can be processed by the adders 164-166 to generate the error signals 176-178. Filtering of the sub-band signals 156-158 will be described herein in greater detail.

Each of the error signals 176-178 can be communicated to a respective DBTK detector 168-170 and to a respective non-linear processor 172-174. The error signals 176-178 can be communicated from the adders 164-166 directly to the non-linear processors 172-174, or communicated via the respective DBTK detectors 168-170.

Each of the DBTK detectors 168-170 can detect whether audio signals are present on a respective sub-band signal 156-158 on the downlink signal path 102, on a respective sub-band signal 110-112 on the uplink signal path 104, or on respective sub-band signals 156-158, 110-112 on both the downlink signal path 102 and the uplink signal path 104. To implement such detection, each of the DBTK detectors 168-170 can receive and process a respective sub-band signal 110-112, a respective sub-band signal 156-158, a respective error signal 176-178, and a noise status indicator 180 received from the noise suppressor 146. Processing of such signals is described in greater detail with reference to FIG. 3.

Still referring to FIG. 1, the DBTK detectors 168-170 can generate DBTK flags 182, 183, 184 corresponding to such determinations. For example, the DBTK flag 182 can be set to a first value if the DBTK detector 168 detects audio present on the sub-band signal 110 (e.g. the communication device 100 is operating in uplink mode), a second value if the DBTK detector 168 detects audio present on the sub-band signal 156 (e.g. the communication device 100 is operating in downlink mode), and a third value if the DBTK detector 168 detects audio present on the sub-band signal 110 and the sub-band signal 156 (e.g. the communication device 100 is simultaneously operating in uplink mode and downlink mode).

Similarly, the DBTK flag 183 can be set to a first value if the DBTK detector 169 detects audio present on the sub-band signal 111, a second value if the DBTK detector 169 detects audio present on the sub-band signal 157, and a third value if the DBTK detector 169 detects audio present on the sub-band signal 111 and the sub-band signal 157. The DBTK detector 170 can set the DBTK flag 184 in a similar manner. As used herein, detecting whether audio is present on the downlink signal path 102 and/or the uplink signal path 104 means detecting whether audio, other than echo or noise signals, is present, for instance whether voice signals are present.

The DBTK detectors 168-170 can communicate the respective DBTK flags 182-184 to the respective adaptive filters 160-162. Each of the adaptive filters 160-162 can be communicatively linked to a respective adder 164-166 to form a closed loop control system in which the respective error signals 176-178 provide feedback to the adaptive filters 160-162. This feedback may be processed by the adaptive filters 160-162, along with the respective DBTK flags 182-184, to filter the respective sub-band signals 156-158. The sub-band signals 156-158 can be filtered to generate the filtered sub-band signals 186-188 which are properly time-aligned with the sub-band signals 110-112, thus improving performance of the DBTK detectors 168-170. For example, the adaptive filters 160-162 can add delay to the sub-band signals 156-158. The adaptive filters 160-162 also can adjust the magnitude of the sub-band signals 186-188 to closely match the magnitude of the sub-band signals 110-112, thereby minimizing the magnitude of the respective error signals 176-178. In that regard, the filtered sub-band signals 186-188 can be processed by the adders 164-166 to generate updated error signals 176-178. Any other of a variety of filtering techniques can be applied to the sub-band signals 156-158 and the invention is not limited in this regard.

The adaptive filters 160-162 each can include a least means square (LMS) algorithm for filtering the sub-band signals 156-158. In one arrangement, the LMS algorithms can be normalized. The coefficients that are adapted by the LMS algorithms to filter the sub-band signals 156-158 can be selected based on the respective DBTK flags 182-184 and the respective error signals. For example, if a particular DBTK flag 182-184 indicates that audio is contained on the downlink signal path 102 and not the uplink signal path 104, the coefficients can be updated using a LMS algorithm in which a respective error signal 176-178 is processed as an input. If the DBTK flag 182-184 indicates that audio is contained on both the downlink signal path 102 and the uplink signal path 104, the LMS algorithm can stop updating the coefficients. The LMS algorithm can again update the coefficients when the DBTK flag 182-184 indicates that audio is contained only on the downlink signal path 102.

The DBTK detectors 168-170 also can communicate the respective DBTK flags 182-184 to the respective non-linear processors 172-174. The non-linear processors 172-174 can select an amount of attenuation to apply to the respective error signals 176-178 based on the DBTK flags 182-184. For instance, if the DBTK flag 182 indicates audio is exclusively present on the sub-band signal 110, the non-linear processor 172 can apply a first level (e.g. low level) of attenuation to the error signal 176, or apply no attenuation to the error signal 176, to generate a sub-band output signal 190. If the DBTK flag 182 indicates audio is exclusively present on the sub-band signal 156, the non-linear processor 172 can apply a second level (e.g. high level) of attenuation to the error signal 176 to generate the sub-band output signal 190. Further, if the DBTK flag 182 indicates audio is present on both the sub-band signal 110 and the sub-band signal 156, the non-linear processor 172 can apply a third level (e.g. medium level) of attenuation to the error signal 176 to generate the sub-band output signal 190. The non-linear processors 173, 174 can operate in a similar manner to generate the sub-band output signals 191, 192, respectively.

The non-linear processors 172-174 can communicate the sub-band output signals 190-192 to a multi-band combiner

194. The multi-band combiner 194 can be, for example, a DFT based synthesizer. The multi-band combiner 194 can combine the sub-band output signals 190-192 to form the output signal 116, which may be a broadband output signal. As used herein, a broadband signal is a signal having greater bandwidth than any one of the sub-bands. For example, the output signal 116 can have a bandwidth equal to the combined bandwidth of the sub-band output signals 190-192. The multi-band combiner 194 can communicate the output signal 116 to the noise suppresser 146.

Figure 2:
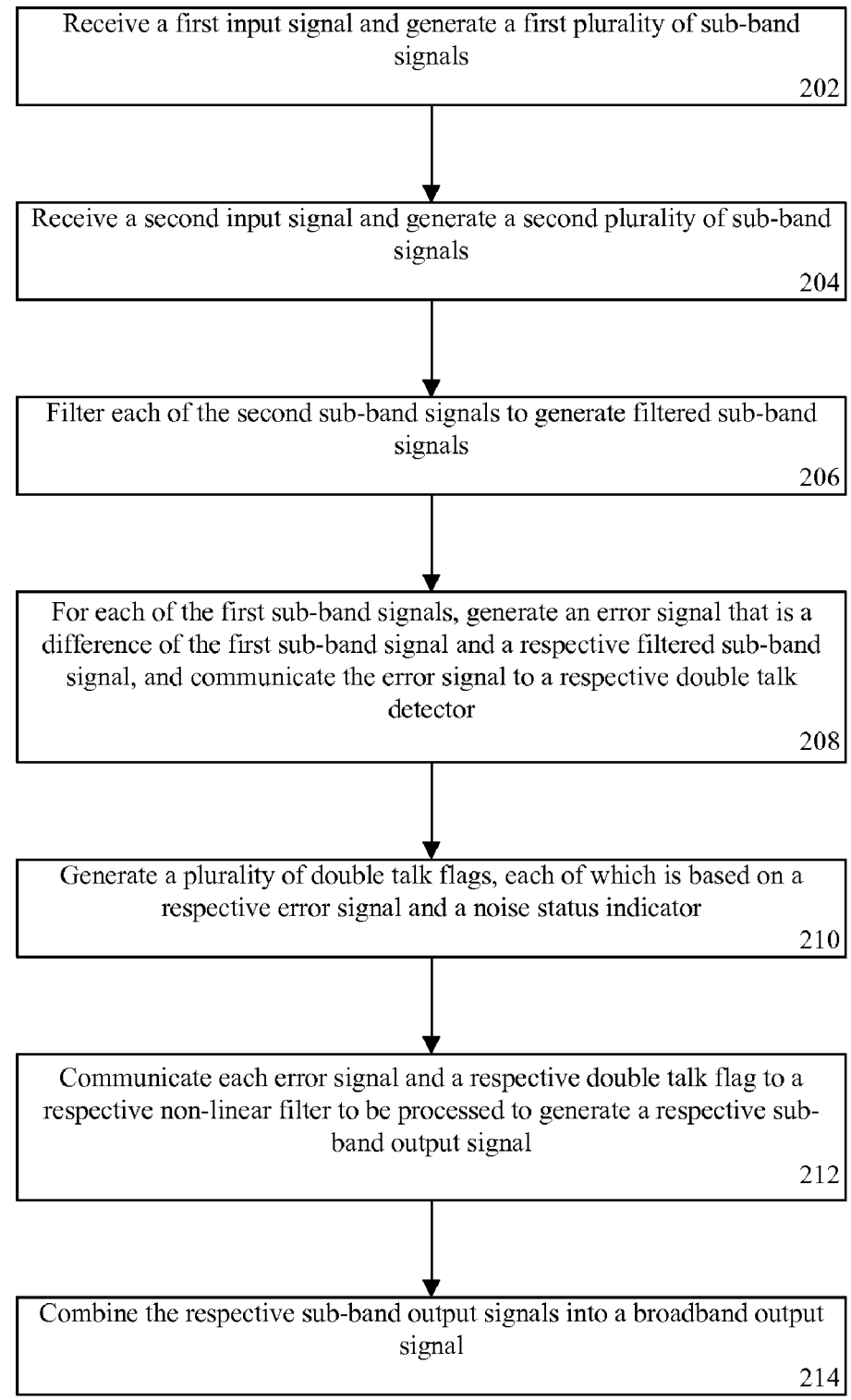
FIG. 2 is a flowchart presenting a method for implementing echo cancellation, which is useful for understanding the present invention.

FIG. 2 is a flowchart presenting a method 200 for implementing echo cancellation. At step 202, a first input signal can be received and from that signal a first plurality of sub-band signals can be generated. At step 204, a second input signal can be received and from that signal a second plurality of sub-band signals can be generated. At step 206 each of the second sub-band signals can be filtered to generate filtered sub-band signals. The filtering coefficients can be selected based on a respective DBTK flag.

Proceeding to step 208, for each of the first sub-band signals, an error signal can be generated. Each error signal can be a difference of a respective first sub-band signal and a respective filtered sub-band signal. Each of the error signals can be communicated to a respective double talk detector. At step 210, a plurality of DBTK flags can be generated. Each of the DBTK flags can be based on a respective error signal and a noise status indicator. The double talk detector also can process the corresponding first and second sub-band signals to generate the DBTK flags.

At step 212, each error signal and the corresponding DBTK flag can be communicated to a respective non-linear filter. The non-linear filters can process the respective error signals and DBTK flags to generate corresponding sub-band output signals. At step 214, the sub-band output signals can be combined into a broadband output signal.

Figure 3:
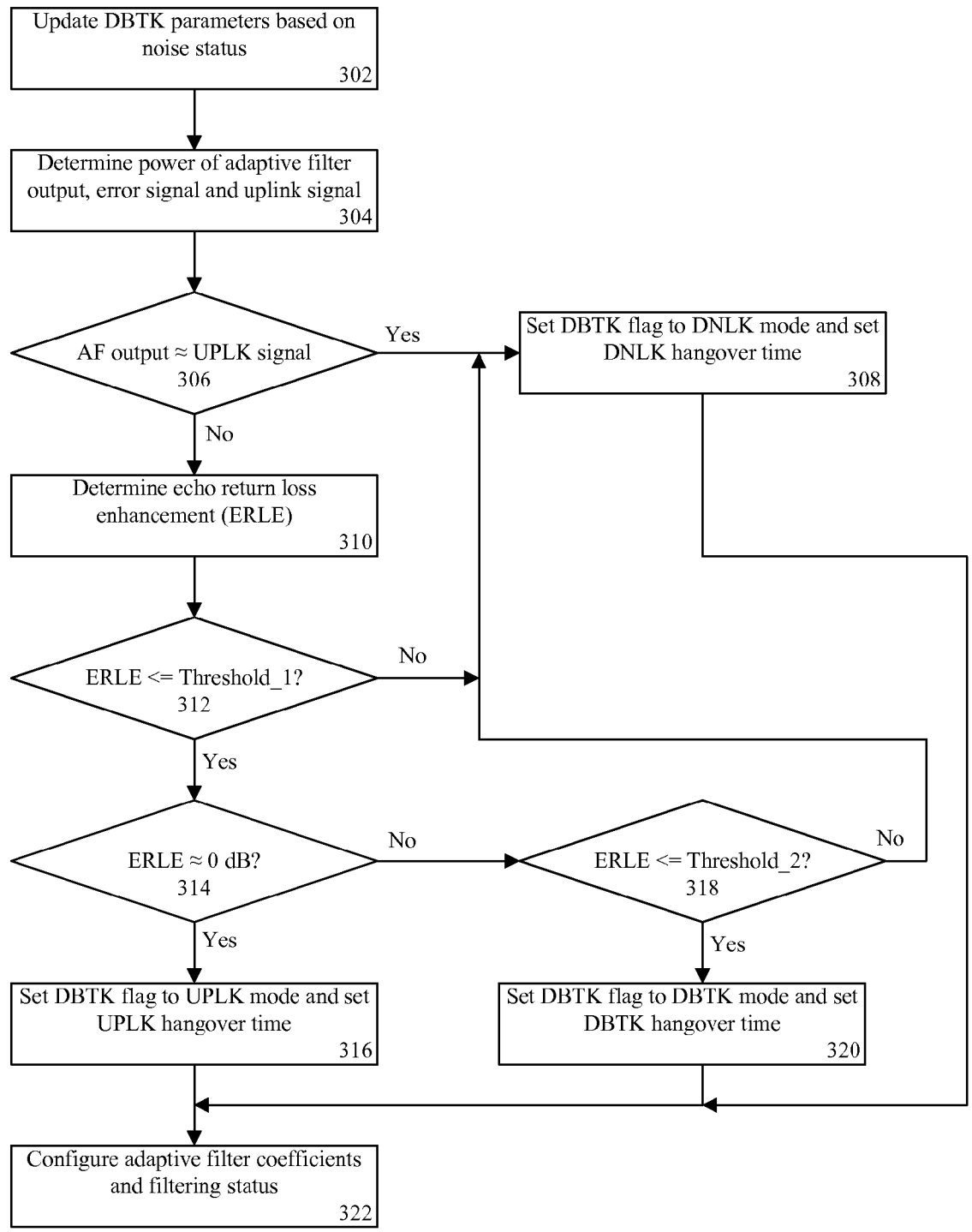
FIG. 3 is a flowchart presenting a method for selecting a double talk flag, which is useful for understanding the present invention.

FIG. 3 is a flowchart presenting a method 300 which can be implemented by each double talk detector to select a respective DBTK flag. At step 302, double talk parameters can be updated based on a noise status indicator provided by the noise suppresser. The double talk parameters that are updated can include, for example, a threshold value for detecting whether an audio signal is present on the downlink signal path. For instance, if the noise status indicator indicates a low amount of noise on the uplink signal path, the threshold value can be set to a relatively low value. If, however, the noise status indicator indicates a high amount of noise on the uplink signal path, the threshold value can be set to a relatively high value. Any number of threshold values can be set based on the noise status, and the invention is not limited in this regard. Determining the status of the noise is described in greater detail with reference to FIG. 4.

Continuing to step 304 of FIG. 3, a double talk detector can determine an output power of a respective adaptive filter, a power of a respective error signal, and a power of a respective uplink signal. Proceeding to decision box 306, if the output power of the adaptive filter is approximately equal to the power of the uplink signal, the process can proceed to step 308 and the DBTK flag can be set to indicate a downlink mode. In addition, a downlink hangover time can be set to a suitable value. The hangover time can be the amount of time the double talk detector maintains the DBTK flag at a particular value before allowing the DBTK flag can be changed. Limiting the frequency at which the DBTK flag can change in this manner can reduce the risk of the DBTK flag being changed due to erroneous signal detection. If the active filter output power is not approximately equal to the uplink signal power, at step 310 an echo return loss enhancement value (ERLE) can be determined. The ERLE can be a ratio of the power of the sub-band output signal to the power of the echo signal.

Referring to decision box 312, if the ERLE value is not below a first threshold value, the method can proceed to step 308, where the DBTK flag can be set to indicate a downlink mode and a downlink hangover time can be set to a suitable value. If the ERLE value is below the first threshold value, the process can continue to decision box 314 and a determination can be made whether the ERLE is approximately equal to 0 dB. If the ERLE is approximately equal to 0 dB, the process can continue to step 316. At step 316, the DBTK flag can be set to indicate uplink mode and an uplink hangover time can be set to a suitable value.

If at decision box 314 the ERLE is not approximately equal to 0 dB, the process can proceed to decision box 318 and a determination can be made whether the ERLE is below a second threshold value. If so, at step 320 the DBTK flag can be set to indicate double talk mode and a double talk hangover time can be set to a suitable value. If the ERLE is not below the second threshold value, the process can proceed to step 308 and the DBTK flag and downlink hangover time can be set as previously described. Proceeding to step 322, the filter coefficients used by the adaptive filter and the filtering status can be updated based on the DBTK flag.

Figure 4:
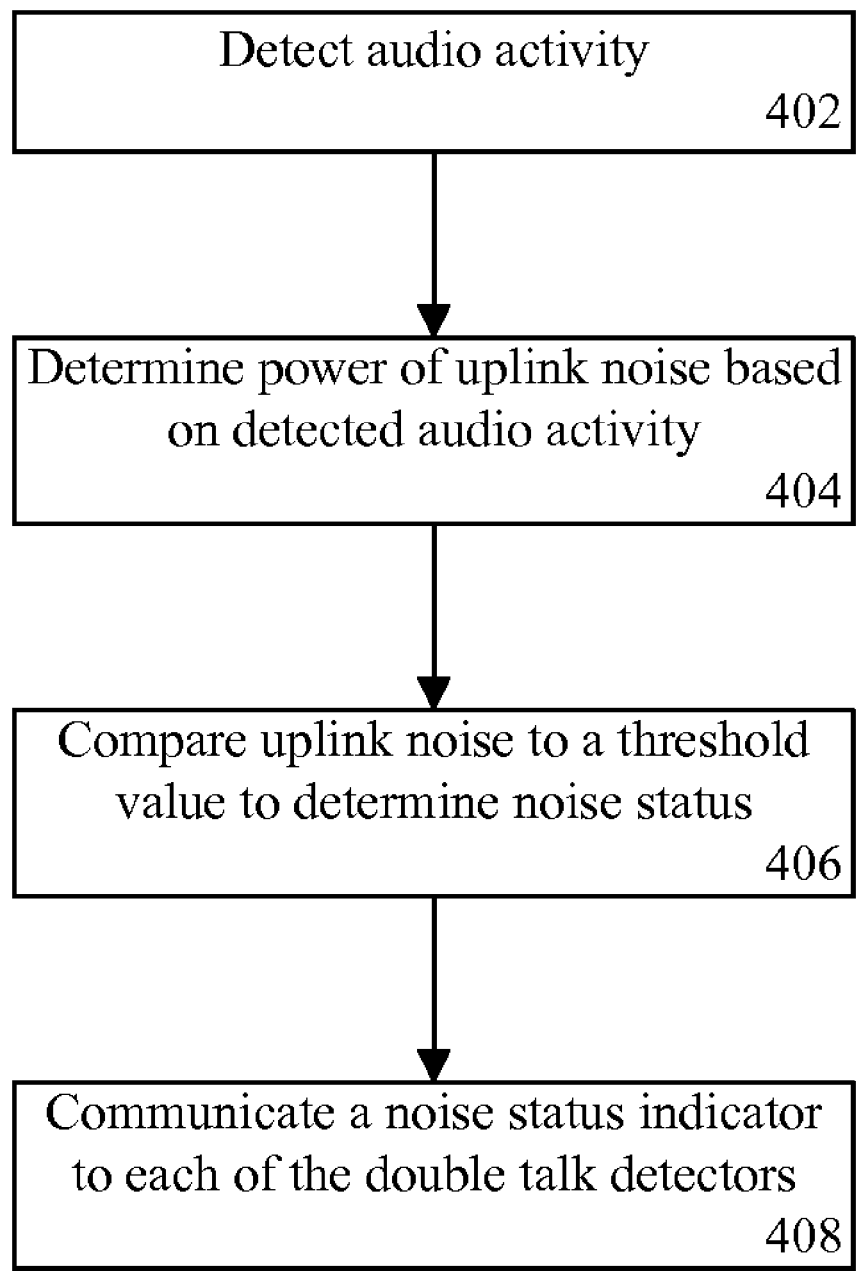
FIG. 4 is a flowchart presenting a method for determining noise status information, which is useful for understanding the present invention.

FIG. 4 is a flowchart presenting a method 400 for determining noise status information. At step 402, audio activity in the uplink signal can be detected, for example by a voice activity detector within the noise suppresser. At step 404, the noise suppresser can determine the power of uplink noise based on the detected audio activity. At step 406, the value of the power of the uplink noise can be compared to a threshold value to determine a noise status, for example whether the noise is high or low. Continuing to step 408, a noise status indicator then can be communicated to each of the double talk detectors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. An echo canceller, comprising:
   a first multi-band filter which receives a first input audio signal and generates a first plurality of sub-band signals, each of the first plurality sub-band signals comprising a respective sub-band of the first input audio signal;
   a second multi-band filter which receives a second input audio signal and generates a second plurality of sub-band signals, each of the second plurality of sub-band signals comprising a respective sub-band of the second input audio signal;
   a plurality of double talk detectors, each of the double talk detectors generating a double talk flag based on at least a respective one of the first sub-band signals and a respective one of the second sub-band signals; and
   a plurality of non-linear processors, each of the non-linear processors receiving at least a respective one of the double talk flags from at least one of the double talk detectors, each of the non-linear processors processing the double talk flag to select an amount of attenuation to apply to respective error signals to generate a sub-band output signal having reduced echo.

2. The echo canceller of claim 1, further comprising:
   a muti-band combiner, the muti-band combiner receiving each of the sub-band output signals and combining the respective sub-band output signals into a broadband output signal.

3. The echo canceller of claim 2, wherein the multi-band combiner receives each of the sub-band output signals from the respective non-linear processors.

4. The echo canceller of claim 2, further comprising:
   a noise suppressor that generates a noise status indicator, the noise suppressor communicating the noise status indicator to each of the plurality of double talk detectors.

5. The echo canceller of claim 1, further comprising:
   a plurality of adaptive filters, each of the adaptive filters receiving a respective one of the double talk flags and a respective one of the second sub-band signals, and filtering the second sub-band signal in accordance with the received double talk flag.

6. The echo canceller of claim 1, further comprising:
   a plurality of adders, each of the adders receiving a respective one of the first sub-band signals and a respective one of the second sub-band signals, generating an error signal that is a difference of the first sub-band signal and the second sub-band signal, and communicating the error signal to a respective double talk detector.

7. The echo canceller of claim 6, wherein each of the respective error signals is also communicated to a respective one of the non-linear processors.

8. The echo canceller of claim 7, wherein each of the respective non-linear processors generates the respective sub-band output signal from the respective error signal.

9. The echo canceller of claim 6, further comprising:
   a plurality of adaptive filters, each of the adaptive filters receiving a respective one of the double talk flags and a respective one of the second sub-band signals, and filtering the second sub-band signal in accordance with the received double talk flag to generate a filtered second sub-band signal;
   wherein the second sub-band signals received by the adders are filtered second sub-band signals.

10. An echo canceller, comprising:
    a first multi-band filter which receives a first input audio signal and generates a first plurality of sub-band signals, each of the first plurality sub-band signals comprising a respective sub-band of the first input audio signal;
    a second multi-band filter which receives a second input audio signal and generates a second plurality of sub-band signals, each of the second plurality of sub-band signals comprising a respective sub-band of the second input audio signal;
    a noise suppressor that generates a noise status indicator, the noise suppressor communicating the noise status indicator to each of a plurality of double talk detectors, each of the plurality of double talk detectors generating a double talk flag based on at least a respective one of the first sub-band signals, a respective one of the second sub-band signals, and the noise status indicator; and
    a plurality of non-linear processors, each of the non-linear processors receiving at least a respective one of the double talk flags from at least one of the double talk detectors, each of the non-linear processors processing the double talk flag to select an amount of attenuation to apply to respective error signals to generate a sub-band output signal having reduced echo.

11. The echo canceller of claim 10, further comprising:
    a plurality of non-linear processors, each of the non-linear processors receiving at least a respective one of the double talk flags from at least one of the double talk detectors, each of the non-linear processors processing the double talk flag to generate a sub-band output signal having reduced echo.

12. The echo canceller of claim 10, further comprising:
    a plurality of adaptive filters, each of the adaptive filters receiving a respective one of the double talk flags and a respective one of the second sub-band signals, and filtering the second sub-band signal in accordance with the received double talk flag.

13. A method of cancelling echo in a duplex communication device, comprising:
    receiving a first input audio signal and generating a plurality of sub-band signals, each of the first plurality of sub-band signals comprising a respective sub-band of the first input audio signal;
    receiving a second input audio signal and generating a second plurality of sub-band signals, each of the second plurality of sub-band signals comprising a respective sub-band of the second input audio signal;

generating a plurality of double talk flags, each of the double talk flags based on at least a respective one of the first sub-band signals and a respective one of the second sub-band signals; and processing each of the double talk flags to select an amount of attenuation to apply to respective error signals to generate a respective sub-band output signal having reduced echo.

14. The method of claim 13, further comprising:
combining the respective sub-band output signals into a broadband output signal.

15. The method of claim 13, further comprising:
generating a noise status indicator; and
communicating the noise status indicator to each of a plurality of double talk detectors, each of which generates a respective one of the double talk flags.

16. The method of claim 13, further comprising:
for each of the first sub-band signals, receiving a respective one of the double talk flags and a respective one of the second sub-band signals, and filtering the second sub-band signal in accordance with the received double talk flag.

17. The method of claim 13, further comprising:
for each of the first sub-band signals and the respective second sub-band signals, generating an error signal that is a difference of the first sub-band signal and the second sub-band signal, and communicating the error signal to a respective double talk detector.

18. The method of claim 17, further comprising:
communicating each of the error signals to a respective one of the non-linear processors.

19. The method of claim 17, wherein processing each of the double talk flags to generate a respective sub-band output signal further comprises processing the error signal.

20. The method of claim 17, further comprising:
for each of the first sub-band signals, receiving a respective one of the double talk flags and a respective one of the second sub-band signals, and filtering the second sub-band signal in accordance with the received double talk flag to generate a filtered second sub-band signal;

wherein generating the error signal comprises generating an error signal that is a difference of the first sub-band signal and the filtered second sub-band signal.

* * * * *